US012084634B1

(12) United States Patent
Roozrokh et al.

(10) Patent No.: US 12,084,634 B1
(45) **Date of Patent: *Sep. 10, 2024**

(54) SCENT BOOSTER FOR LAUNDRY COMPRISING PEG, SODIUM BICARBONATE, AND SODIUM ACETATE TRIHYDRATE

(71) Applicant: Tufco, L.P., Los Angeles, CA (US)

(72) Inventors: Shahram Roozrokh, Hauppauge, NY (US); Egal Gabbay, Los Angeles, CA (US)

(73) Assignee: Tufco, L.P., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,377

(22) Filed: Nov. 28, 2023

Related U.S. Application Data

(63) Continuation of application No. 18/322,681, filed on May 24, 2023, now Pat. No. 11,834,636.

(51) Int. Cl.
*C11D 3/10* (2006.01)
*C11D 3/50* (2006.01)
*C11D 11/00* (2006.01)

(52) U.S. Cl.
CPC .......... *C11D 3/502* (2013.01); *C11D 11/0082* (2013.01); *C11D 2111/12* (2024.01)

(58) Field of Classification Search
CPC ........... C11D 3/10; C11D 3/2065; C11D 3/40; C11D 3/50; C11D 3/502; C11D 3/505; C11D 7/12; C11D 7/265; C11D 9/442; C11D 11/0017; C11D 17/0086
See application file for complete search history.

(56) References Cited

U.S. PATENT DOCUMENTS

| | | | | |
|---|---|---|---|---|
| 5,188,753 | A * | 2/1993 | Schmidt | C11D 17/0069 510/516 |
| 7,867,968 | B1 | 1/2011 | Aouad | |
| 7,871,976 | B1 | 1/2011 | Aouad | |
| 10,683,474 | B2 | 6/2020 | Brooker et al. | |
| 10,913,920 | B1 * | 2/2021 | van Buskirk | C11D 3/046 |
| 11,834,636 | B1 * | 12/2023 | Roozrokh | C11D 11/0082 |
| 2017/0226690 | A1 | 8/2017 | Brain et al. | |
| 2018/0100124 | A1 * | 4/2018 | Piorkowski | C11D 17/0047 |
| 2018/0346850 | A1 | 12/2018 | Piorkowski | |
| 2020/0325421 | A1 * | 10/2020 | Segler | C11D 3/2093 |
| 2020/0325424 | A1 * | 10/2020 | Schmiedel | C11D 3/505 |
| 2021/0130747 | A1 * | 5/2021 | Subinya | C11D 3/222 |
| 2021/0130748 | A1 | 5/2021 | Panzica et al. | |

FOREIGN PATENT DOCUMENTS

| | | | |
|---|---|---|---|
| WO | 2008009521 | A1 | 1/2008 |

* cited by examiner

*Primary Examiner* — Charles I Boyer
(74) *Attorney, Agent, or Firm* — SoCal IP Law Group LLP; Steven C. Sereboff

(57) ABSTRACT

A composition for use in scent booster beads comprises a dispersant, a first solubility agent, a fragrance, and a second solubility agent, all of these ingredients being present in varied amounts by weight of the composition.

19 Claims, No Drawings

SCENT BOOSTER FOR LAUNDRY COMPRISING PEG, SODIUM BICARBONATE, AND SODIUM ACETATE TRIHYDRATE

RELATED APPLICATIONS

The present application is a continuation of U.S. Ser. No. 18/322,681, filed May 24, 2023, entitled SCENT BOOSTER FOR LAUNDRY, the contents of which is incorporated herein.

BACKGROUND

Field

This disclosure relates to laundry scent boosters and methods for manufacturing laundry scent boosters.

Description of the Related Art

Laundry soaps and detergents are a necessity of modern life, and there is a wide array of such products available to meet different consumer preferences and needs. The soaps and detergents may be configured to work best in certain types of washing machines, for example, and may comprise ingredients and concentrations thereof which take into account such factors as level of soiling, wash temperature, and the like.

One consideration for users of laundry soaps and detergents is whether the detergents are scented or unscented. This is a personal consumer choice, some preferring a non-scented laundry wash while others may prefer the inclusion in the detergent of a scent or fragrance. Amongst the latter group, the choices are considerable and many detergents will incorporate a scent which has a certain fragrance or smell. The scents may be more subtle or more noticeable and may be configured so as to have a longer or shorter duration on clothing which has been washed using such a detergent. There are many options in the manufacture of such detergents.

Scent boosters are a related product category. Scent boosters allow the consumer to set a fragrance or smell to their preference, apart from that provided by the soap or detergent. Some soaps and detergents include a scent booster. Scent boosters typically are formed into small units, often in the size and shape of beads, which are solids at room temperature and dissolve in a washing machine to release fragrance.

Temperatures in a washing machine may vary, and typically may be selected by the user. Typical washing machines either allow the user to select a specific temperature (often available in increments such as ten degrees) or have relative temperature options usually designated as hot, warm, cool and cold. These settings correspond to a temperature of water which is introduced into the washing machine's wash tub. Hot is generally 54 C to 60 C. Warm is generally between 32 C to 49 C. Cold is generally between 15 C to 30 C.

DETAILED DESCRIPTION

Several scent boosters are described herein, as well as methods of manufacture.

The scent booster composition may at its essence comprise a dispersant and a fragrance. The composition may further comprise one or more solubility agents, dyes and/or color agents.

One scent booster formulation described herein comprises a dispersant in the amount of about 50% to about 60% by weight of the composition; a first solubility agent in the amount of about 15% to 20% by weight of the composition; fragrance in the amount of 5% to about 10% by weight of the composition; and a second solubility agent in the amount of about 15% to about 25% by weight of the composition. The composition may further comprise a dye in the amount of about 0.01% to 15% of the composition.

Another formulation consists essentially of: dispersant in the amount of about 54.5% by weight of the composition; a first solubility agent in the amount of about 18.2% by weight of the composition; fragrance in the amount of 9.1% by weight of the composition; and a second solubility agent in the amount of about 18.2% by weight of the composition.

Another formulation comprises: dispersant in the amount of about 50% to about 60% by weight of the composition, the dispersant having a molecular weight of about 4000; and fragrance in the amount of 5% to about 10% by weight of the composition, the fragrance being freely dispersed in the dispersant. The composition may further comprise: a first solubility agent in the amount of about 15% to 20% by weight of the composition; and a second solubility agent in the amount of about 15% to about 25% by weight of the composition.

The disclosed formulations may be stand-alone or used in laundry detergents and soaps, in order to enhance the smell of freshly washed clothes and linens.

A method of treating laundry is disclosed. The method comprises adding a composition as described above to a laundry wash load.

A method of manufacturing such compositions is also disclosed. In the method, the scent booster may be included in a detergent, so that the detergent will not only clean the clothes but also impart a fragrance to the clothes. The scent booster may be distinct from detergent, and may be beads. The scent booster made be made by: adding a dispersant in the amount of about 50% to about 60% by weight of the composition to a reactor vessel; heating the dispersant in the reactor vessel to a temperature between about 65° C. and 75° C.; adding a first solubility agent to the dispersant in the reactor vessel in the amount of about 15% to 20% by weight of the composition so that the first solubility agent is substantially dispersed in the dispersant; adding fragrance into the reactor vessel in the amount of 5% to about 10% by weight of the composition and mixing; and adding a second solubility agent in the reactor vessel in the amount of about 15% to about 25% by weight of the composition and mixing. The mixture is then brought to room temperature (i.e., 13° C.-30° C.), for example by cooling.

The dispersant utilized in the composition may be selected based on its solubility to water, molecular weight, temperature range and dispersion ability. Dispersants with a range of such solubility, molecular weight, temperature ranges and dispersion ability may work. A combination of dispersants may be utilized to balance these qualities. The dispersant molecular weight may range from about 3500 to about 4500, from about 3700 to about 4300, from about 3900 to 4100, such as 4000.

The dispersant in the composition may function as a dispersing agent, operating to facilitate stabilization and dispersion of other components in the composition within the composition. The dispersant may be solid at room temperature, and may continue to be a solid during shipping (i.e., when exposed to environmental temperature variations that may be between −55° C. and 55° C.). Once exposed to a laundering environment in a washing machine, the dispersant releases the fragrance. The release may occur through one or more mechanisms such as melting or dissolving. Melting may occur through a combination of temperature and time. Dissolving may be through exposure to various items in the laundry external to the scent booster product, such as water and/or detergents. The dispersant may be a cost effective ingredient with flexibility in assuming desired shape and size formation. Many dispersants may be used in the scent booster such as polymeric dispersants, alkyl aryl sulfonate, sodium lauryl ether sulfate, compounds of multiple polyethylene glycol units, Dow Carbowax®, propylene glycol, dipropylene, some types of Noverite™ functional polymers from Lubrizol, a homopolymer of acrylic acid such as Dow ACUSOL™.

The dispersant may comprise about 50% to 60% of the composition by weight. The dispersant may comprise about 53% to 57% by weight of the composition, and more specifically about 55% or 54.5%.

The composition comprises a fragrance, and the type of fragrance may be many and varied. The fragrance may be present by about 5% to about 10% by weight, or about 8% to about 10% by weight. The fragrance may be freely dispersed in the composition and/or may be encapsulated or otherwise used to release in circumstances or environments on a time release basis.

In one embodiment, approximately 5% by weight of the fragrance is "free oil," which is a regular fragrance, and the other approximately 5% by weight is the encapsulated fragrance. These are mixed together. These relative proportions may be varied. Total fragrance may be up to 10% by weight.

The composition further comprises a first solubility agent. The first solubility agent may be one or more of soda ash, sodium chloride, sodium bicarbonate, sodium citrate, sodium sulphate, sodium phosphorate. The first solubility agent may be present to achieve desired pH levels and to facilitate wax formation if a solid product is desired.

The first solubility agent may comprise about 15% to about 20% of the composition by weight, about 16% to 19% of the composition by weight, or about 17% to 19% of the composition by weight.

The composition may comprise a second solubility agent. The second solubility agent may be one or more of sodium acetate·3H2O, sodium acetate, sodium sulfate decahydrate or calcium chloride hexahydrate. The second solubility agent may be included to help dissolve the composition in water and also potentially increase viscosity.

The second solubility agent may comprise about 15% to about 25% of the composition by weight, about 15% to 20% of the composition by weight, or about 17% to 19% of the composition by weight.

The composition may include a dye or color agent which may take the form of color slurry. The color slurry may be achieved by adding color powder to some or all of the fragrance to form a mixture which then becomes a component of the composition.

The dye or color agent may be present in the composition between about 0.01% and 1% by weight, or about 0.01% to 0.05%.

The dye or color agent allows the composition to be of the desired hue to enhance the appeal or appearance of the product.

One formulation comprises: about 50% to about 60% by weight of a dispersant having a molecular weight of about 4,000; about 15% to about 20% by weight of a first solubility agent; about 5% to about 10% by weight of a selected fragrance; and about 15% to about 25% by weight of a second solubility agent. Further, the composition may comprise a color or color slurry present as about 0.01% to about 1% by weight of the composition.

The composition may be manufactured by several different procedures which will achieve the end result of a composition having the relative proportions of ingredients as described above.

To formulate beads from the composition, the ingredients may be mixed together and then extruded, granulated, molded or formed into beads. Depending on the ingredients, the formulation type, the desired shape and desired structure, it may be desirable to control temperature, pressure, humidity, available volume. These variables controls may be controlled to be raised, lowered and varied continuously or over time, to achieve the desired output.

In a process for formulating the composition at about sea level into beads which will be used in ordinary washing machines, a dispersant is selected which is solid at room temperature. This necessitates an elevated temperature during processing to obtain a desired mix quality, but also based upon the other selected ingredients. The dispersant is placed in a principal reactor, and thereafter heated to about 60° C., at which point it should have melted wax characteristics. The dispersant is thereafter maintained in a generally liquid state at a selected temperature range. Depending on the dispersant, this may be from about 65° C. to about 75° C., and may be adjusted appropriately to obtain this condition. The temperature range may extend as low as 50° C. and may extend as high as 250° C.

The first solubility agent is then added to the principal reactor and mixed well with the dispersant. The mix may be maintained at the selected temperature and in these conditions the first solubility agent disperses within the dispersant. When this dispersion has been achieved, the fragrance is then added to the principal reactor and mixed in well. The temperature range may be adjusted appropriately to obtain these results.

In the next step, the second solubility agent is added to the principal reactor, once again being well mixed and maintaining the mixture within the selected temperature range. The last ingredient that is added to the principal reactor is the color slurry, mixing and maintaining the temperature. The color slurry may also be added as a color powder to the fragrance, and mixing it in. As new ingredients are added, it may be desirable to increase or decrease the temperature so that the mixture has an appropriate quality at the time, such as solubility, flowability and pourability.

Once the ingredients of the composition have been added and mixed as set out above, or through a variation or alternative procedure, the product may be rendered into any one of many desired shapes and sizes. This may be effected by placing or dropping the product taken from the principal reactor on a cold surface and waiting for it to cool, whereupon it will be solidified and ready for further processing. For example, the product could be formed into beads having a blueberry shape. Like a blueberry, the beads may have a round curvature and be convex above and below an equator. Like a blueberry, the beads may be circular in cross-section. Like most blueberries, the curvature of the beads may be compressed both above and below the equator giving most of the beads a blueberry-like plumpness. Like many blueberries, the beads may have a flat face which truncates one of the convex sides yet well below the equator.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A composition comprising:

- a dispersant comprising polyethylene glycol (PEG) in the amount of about 50% to about 60% by weight of the composition;
- a first solubility agent comprising sodium bicarbonate in the amount of about 15% to 20% by weight of the composition;
- fragrance in the amount of about 5% to about 10% by weight of the composition; and
- a second solubility agent comprising sodium acetate·3H2O in the amount of about 15% to about 25% by weight of the composition;
- wherein the composition is a solid at room temperature and dissolves when exposed to water.

2. The composition as claimed in claim 1 further comprising a color slurry in the amount of about 0.01% to 15% of the composition.

3. The composition as claimed in claim 1 wherein the PEG has a molecular weight of between about 3500 and about 4000.

4. The composition as claimed in claim 1 wherein the PEG has a molecular weight of about 4000.

5. The composition as claimed in claim 1 wherein the PEG is present in the amount of about 54.5% by weight of the composition.

6. The composition as claimed in claim 1 wherein the sodium bicarbonate is present in the amount of about 18.2% by weight of the composition.

7. The composition as claimed in claim 1 wherein fragrance is present in the amount of about 9.1% by weight of the composition.

8. The composition as claimed in claim 1 wherein the sodium acetate·3H2O is present in the amount of about 18.2% by weight of the composition.

9. The composition as claimed in claim 2 wherein the color slurry is present in the amount of about 0.20% by weight of the composition.

10. A composition as claimed in claim 1 wherein the fragrance is freely dispersed in the PEG.

11. A composition as claimed in claim 1 wherein the composition is configured as a plurality of scent booster beads.

12. A method of treating laundry comprising adding a composition according to claim 1 to a laundry wash load.

13. A method of making a composition comprising:

- adding polyethylene glycol (PEG) in the amount of about 50% to about 60% by weight of the composition to a reactor vessel;
- heating the PEG in the reactor vessel to a temperature between about 65° C. and 75° C.;
- adding sodium bicarbonate to the PEG in the reactor vessel in the amount of about 15% to 20% by weight of the composition so that the sodium bicarbonate is substantially dispersed in the PEG;
- adding fragrance into the reactor vessel in the amount of 5% to about 10% by weight of the composition and mixing; and
- adding sodium acetate·3H2O in the reactor vessel in the amount of about 15% to about 25% by weight of the composition and mixing.

14. The method as claimed in claim 13 wherein the temperature between about 65° C. and 75° C. is maintained for each addition.

15. The method as claimed in claim 13 further comprising the step of adding a color slurry to the reactor vessel in the amount of about 0.01% to about 1% by weight of the composition.

16. The method as claimed in claim 13 further comprising the step of placing a dose of the composition on a cold surface to solidify into a selected size and shape.

17. The method as claimed in claim 13 wherein the composition is configured as a plurality of scent booster beads.

18. The method as claimed in claim 17 wherein the beads remain solid at room temperature and dissolve when exposed to water.

19. A composition for use with a laundry wash, the composition comprising:

- a dispersant comprising polyethylene glycol (PEG) in the amount of about 50% to about 60% by weight of the composition;
- a first solubility agent comprising sodium bicarbonate in the amount of about 15% to 20% by weight of the composition;
- fragrance in the amount of about 5% to about 10% by weight of the composition; and
- a second solubility agent comprising sodium acetate·3H2O in the amount of about 15% to about 25% by weight of the composition.

* * * * *